United States Patent
Esposito

(10) Patent No.: US 11,030,140 B2
(45) Date of Patent: Jun. 8, 2021

(54) BUS NETWORK TERMINATOR

(71) Applicant: Frederic Vladimir Esposito, Luton (GB)

(72) Inventor: Frederic Vladimir Esposito, Luton (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/570,611

(22) PCT Filed: Apr. 27, 2016

(86) PCT No.: PCT/GB2016/051191
§ 371 (c)(1),
(2) Date: Oct. 30, 2017

(87) PCT Pub. No.: WO2016/174428
PCT Pub. Date: Nov. 3, 2016

(65) Prior Publication Data
US 2018/0285303 A1    Oct. 4, 2018

(30) Foreign Application Priority Data
Apr. 30, 2015 (GB) .................................. 1507495

(51) Int. Cl.
*G06F 13/40* (2006.01)
*H04B 3/46* (2015.01)
*H04L 12/26* (2006.01)

(52) U.S. Cl.
CPC ........... *G06F 13/4086* (2013.01); *H04B 3/46* (2013.01); *H04L 43/50* (2013.01)

(58) Field of Classification Search
CPC ........ G06F 13/4086; H04B 3/46; H04L 43/50
(Continued)

(56) References Cited

U.S. PATENT DOCUMENTS 4,190,821 A * 2/1980 Woodward ............. H04B 1/745
370/223
4,373,121 A * 2/1983 Sartori .................. H04M 3/301
379/30

(Continued)

FOREIGN PATENT DOCUMENTS

JP        2008123084 A    5/2008

OTHER PUBLICATIONS

International Search Report for PCT Application No. PCT/GB2016/051191, dated Jul. 25, 2016, 2 pages, European Patent Office.

*Primary Examiner* — Paul R. Myers
(74) *Attorney, Agent, or Firm* — Stinson LLP

(57) ABSTRACT

The present invention provides for an improved network bus terminator (4), and related bus networks and bus network segments/trunks (1), and comprising a bus network terminator (4) including bus network termination functionality and a diagnostic analyzer (20) and wherein the degree of diagnostic functionality provided within the terminator (4) can then, as with the terminator itself, be provided as an inherent feature of the segment/trunk (1), and thus also the bus network, and can comprise limited, simple but suitably effective diagnostic functionality, and which can be inherently suited to bus analysis during a commissioning, and/or initial deployment, phase and be provided in a cost-effective manner.

18 Claims, 1 Drawing Sheet

(58) Field of Classification Search
USPC .......................................................... 710/32
See application file for complete search history.

(56) References Cited

U.S. PATENT DOCUMENTS

| | | | | | |
|---|---|---|---|---|---|
| 4,396,809 | A | * | 8/1983 | Brunssen | H04M 3/301 379/399.01 |
| 4,451,916 | A | * | 5/1984 | Casper | H04B 10/25891 714/4.3 |
| 4,578,761 | A | * | 3/1986 | Gray | H04M 3/30 702/65 |
| 4,817,080 | A | * | 3/1989 | Soha | H04L 43/12 370/252 |
| 4,962,501 | A | * | 10/1990 | Byers | G06F 11/10 714/703 |
| 5,117,331 | A | * | 5/1992 | Gebara | G06F 13/4086 327/310 |
| 5,257,287 | A | * | 10/1993 | Blumenthal | H03K 5/023 341/55 |
| 5,287,463 | A | * | 2/1994 | Frame | G06F 13/4213 710/105 |
| 5,294,921 | A | * | 3/1994 | Hotka | H04L 43/00 340/3.21 |
| 5,402,485 | A | * | 3/1995 | Takato | H04M 3/005 379/345 |
| 5,757,249 | A | * | 5/1998 | Gabara | H04L 25/0298 333/101 |
| 5,841,836 | A | * | 11/1998 | Dunn | G06F 11/2294 379/26.01 |
| 5,870,451 | A | * | 2/1999 | Winkler | H04M 3/085 324/534 |
| 6,202,103 | B1 | * | 3/2001 | Vonbank | G06F 11/221 710/15 |
| 6,208,955 | B1 | * | 3/2001 | Provan | G06F 11/261 703/20 |
| 6,285,966 | B1 | * | 9/2001 | Brown | G05B 19/0425 702/182 |
| 6,311,296 | B1 | * | 10/2001 | Congdon | G06F 11/0745 710/301 |
| 6,367,033 | B1 | * | 4/2002 | Jibbe | G06F 11/3414 714/37 |
| 6,480,925 | B1 | * | 11/2002 | Bodo | G06F 3/0626 710/301 |
| 6,871,253 | B2 | * | 3/2005 | Greeff | G06F 13/1684 710/316 |
| 7,289,922 | B1 | * | 10/2007 | Mikulchenko | G01R 29/26 702/69 |
| 7,773,727 | B1 | * | 8/2010 | Eslambolchi | H04M 3/36 379/14.01 |
| 8,204,958 | B2 | * | 6/2012 | Oliynyk | H04L 43/026 370/252 |
| 10,585,997 | B1 | * | 3/2020 | Ulusoy | G06F 30/3308 |
| 2002/0167904 | A1 | * | 11/2002 | Borgeson | G05B 19/4183 370/241 |
| 2003/0025587 | A1 | * | 2/2003 | Whitney | H01C 7/12 338/22 R |
| 2003/0057518 | A1 | * | 3/2003 | Schaper | H01L 27/016 257/533 |
| 2004/0015722 | A1 | * | 1/2004 | Klotz | H04L 63/12 726/26 |
| 2004/0093183 | A1 | | 5/2004 | Seel | |
| 2004/0139264 | A1 | * | 7/2004 | Gros | H04L 12/4625 710/305 |
| 2004/0148124 | A1 | * | 7/2004 | Nitschke | G05B 9/02 702/122 |
| 2005/0060598 | A1 | * | 3/2005 | Klotz | G06F 11/2257 714/4.2 |
| 2005/0240828 | A1 | * | 10/2005 | Rothman | G06F 11/3485 714/43 |
| 2007/0088861 | A1 | * | 4/2007 | Dudley | G06F 11/3414 710/15 |
| 2007/0248018 | A1 | * | 10/2007 | Ranallo | G06F 11/221 370/241 |
| 2007/0266183 | A1 | * | 11/2007 | Lanning | G06F 11/221 710/1 |
| 2008/0181603 | A1 | * | 7/2008 | Liu | H04B 10/0793 398/25 |
| 2008/0211660 | A1 | * | 9/2008 | Takeuchi | G05B 19/0428 340/514 |
| 2010/0011146 | A1 | * | 1/2010 | Saghi | G06F 13/4282 710/314 |
| 2010/0110908 | A1 | * | 5/2010 | Guichard | H04L 43/50 370/252 |
| 2012/0159250 | A1 | * | 6/2012 | Aull | G06F 11/2247 714/26 |
| 2012/0314749 | A1 | * | 12/2012 | Morand | H04L 12/40032 375/228 |
| 2013/0066951 | A1 | * | 3/2013 | Agranat | H04J 14/0227 709/203 |
| 2013/0113575 | A1 | * | 5/2013 | Easter | H03H 7/24 333/103 |
| 2013/0136007 | A1 | * | 5/2013 | Jiang | H04L 12/417 370/242 |
| 2013/0151269 | A1 | * | 6/2013 | Chaffee | G06F 19/328 705/2 |
| 2014/0122696 | A1 | * | 5/2014 | Gronlund | H04L 43/045 709/224 |
| 2016/0172739 | A1 | * | 6/2016 | Srirattana | H01P 5/185 333/111 |
| 2016/0292106 | A1 | * | 10/2016 | Spiegel | G06F 13/4295 |

* cited by examiner

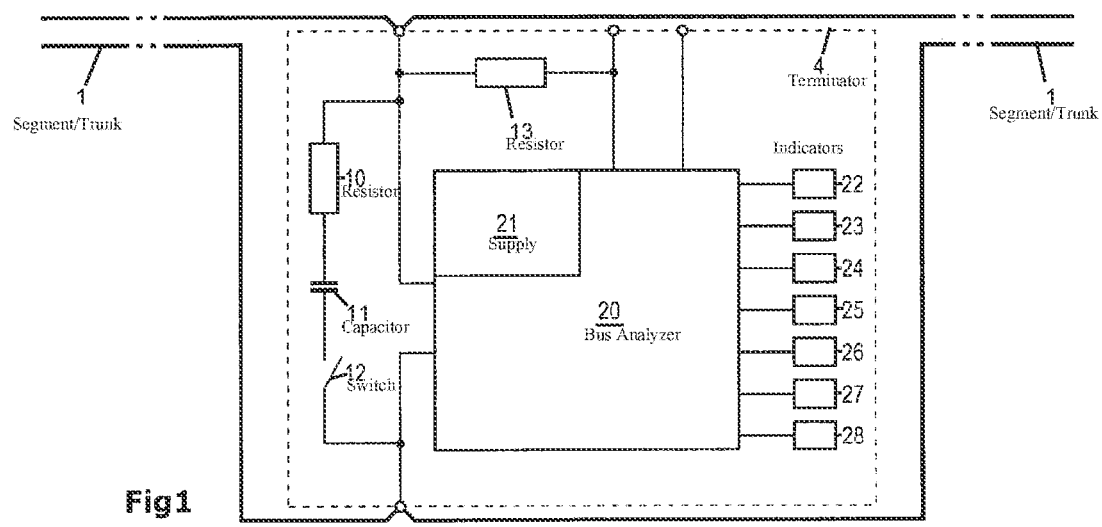
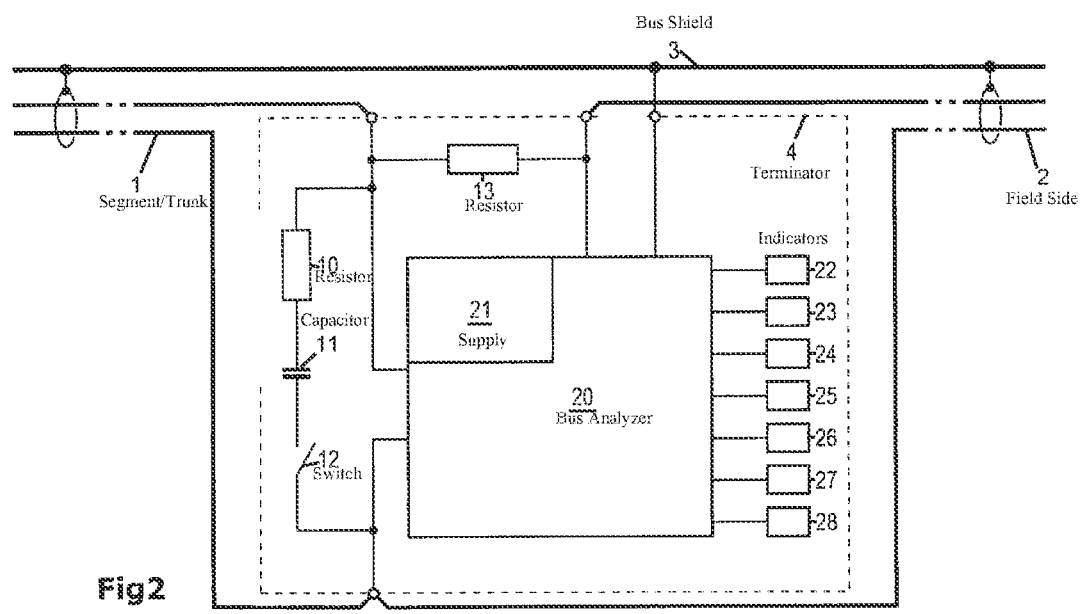
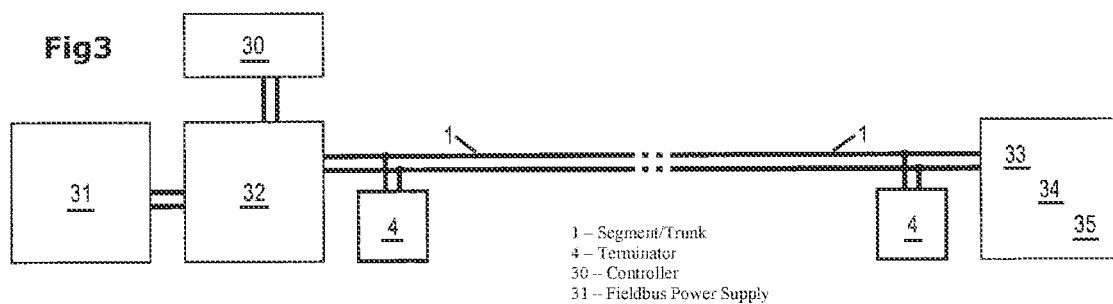

BUS NETWORK TERMINATOR

The present invention relates to a terminator for use in providing termination within a bus network and in particular, but not exclusively, to a Fieldbus H1 or Profibus PA terminator.

Problems such as communication errors can arise from signal reflections in bus networks unless the ends of such networks are properly terminated. Appropriate termination involves employment of a terminator device at each end of the bus network and which serves to absorb signals appearing in the network so as to prevent reflections.

In Fieldbus/Profibus networks for example, each bus segment/trunk requires two terminators, one located at each end, and which are generally equivalent to a 1 µF capacitor and 100Ω resistor connected in series. Each terminator serves to both shunt the bus current so as to keep the current signals on the segment/trunk within the specified levels and to protect against signal reflections through appropriate matching with the line impedance of the segment/trunk.

Within a Fieldbus/Profibus network, the terminator can comprise a stand-alone device, or can be incorporated into the device couplers that serve to connect fieldbus devices to the segment/trunk via spurs. If incorporated into a device coupler, a switching arrangement is also often associated with the terminator to allow for selective enablement of the terminator. It is only the device coupler connected at the end of the segment/trunk that should provide the required termination, and so the terminator can be enabled/disabled as required depending upon the position of the device coupler on the segment/trunk.

A terminator can be viewed as an essential, and therefore ever-present, element at the end of a Fieldbus/Profibus segment/trunk. However, currently its functionality is limited to one of merely offering the required termination.

Bus networks such as Fieldbus/Profibus networks often exhibit complex/specialised configurations for the operation/monitoring of complex, performance critical, and often potentially costly and hazardous industrial systems/processes.

Correspondingly complex/specialised diagnostic analysis is also then required.

Diagnostic requirements arise both during commissioning, and subsequent operation, of the network and a variety of sophisticated network analyzer devices are available for providing detailed diagnostic functionality and taking into account the variety of potentially problematic situations that can arise. Separate sophisticated diagnostic devices are currently employed in relation to bus networks such as Fieldbus/Profibus networks.

This can prove disadvantageous insofar as separate steps for obtaining, preparing and using known diagnostic analyzers are required and the level of diagnostic capability is often not matched, often being overly complex and highly functional, as compared with the level of diagnostic activity required. Inefficiencies can therefore be introduced into the diagnostic process and potential cost effectiveness can also be impaired, particularly since known diagnostic devices such as known bus analyzers are expensive. Known bus analyzers also tend to require specialist trained staff for their implementation and use, and which further limits their cost-effectiveness and can limit the ease and speed by which they can be deployed if such personnel are not readily available.

The present invention seeks to provide for a network bus terminator having advantages over known such terminators and which, further, can provide for bus networks and bus network segments/trunks having advantages over known such networks/segments/trunks.

According to one aspect of the present invention there is provided a bus network terminator including bus network termination functionality and a diagnostic analyzer.

The invention can prove advantageous in so far as the degree of diagnostic functionality provided within the terminator is then, as with the terminator itself, provided as an inherent feature of the segment/trunk, and thus also the bus network.

Advantageously, the diagnostic bus analyzer is arranged to provide basic information concerning the segment/trunk.

Such basic information can comprise, but is not limited to, one or more of segment voltage, segment traffic and segment integrity.

The invention advantageously therefore allows for quick-glance diagnostic functionality without the need for a sophisticated analyzer and so as to determine whether any initial problems might arise. If further investigation is required, this can then readily be conducted by way of a separate more sophisticated analyzer.

The invention can prove particularly useful during the commissioning phase of a segment/trunk and bus network particularly since the basic diagnostic functionality is inherent within each terminator which, again, form essential inherent elements of the segment/trunk. Immediate basic diagnosis is therefore readily possible from even the earliest stages in the bus network formation, in particular for basic simple analysis particularly suited to the network commissioning phase.

The diagnostic bus analyzer of the present invention can comprise a basic, low-power, microprocessor, with minimal required electronics, to provide the required basic level of bus analysis.

As non-exhaustive examples, the bus analyzer can be arranged to analyse trunk voltage, whether high, low, noisy or lacking in stability.

Further, the bus analyzer can be arranged to identify whether data is present on the segment/trunk and, if so, the degree of data activity and/or direction of transmission.

As further examples, the bus analyzer can be arranged to determine data signal amplitude and also data signal width and/or jitter.

As a yet further feature, an additional short-to-shield indication can be provided. The terminator can also incorporate a user interface that can comprise any appropriate audio and/or visual output, such as simple LED output device or array.

Additionally, or alternatively, the terminator can be arranged with a bus to shield low-impedance condition indicator, and which can be responsive to, for example, detection of loss of isolation exhibiting impedance from values of a few 100 KΩ, down to a short circuit condition.

The terminator of the invention can also comprise a bus device which can further be addressable from a host device, and/or be addressable from a separate system, by way of a wired, or wireless, connection, and if appropriate, from any required remote location.

The terminator of the present invention can be incorporated into any appropriate/required Fieldbus/Profibus segment/trunk, whether in explosive environments or otherwise.

As will be appreciated therefore, the terminator of the invention can comprise a line impedance terminator offering in-line diagnostic functionality.

In particular, the basic, simple, yet effective, functionality of the analyzer of the present invention can advantageously remain in situ, without any impact on cost effectiveness, and potentially as a standard fitting. This aspect of the invention contrasts favourably with potentially expensive, and unnecessary complex, analyzers, often fitted in a one-off manner, with only specific complex trouble-shooting scenarios in mind.

The invention is described further hereinafter, by way of example only, with reference to the accompanying drawings in which:

FIG. 1 is a schematic diagram of a terminator device according to an embodiment of the present invention;

FIG. 2 is a schematic diagram similar to that of FIG. 1 of a terminator device of the present invention and arranged on a bus with a bus shield; and FIG. 3 is a schematic diagram of a typical fieldbus segment/trunk employing terminator devices such as that of FIGS. 1 and 2.

Turning first to FIG. 1 there is illustrated a section of a network bus 1, such as a trunk/segment of a Fieldbus or Profibus system and within which a terminator 4 according to an embodiment of the present invention, and so, in this example, including diagnostic functionality, is integrally provided.

The illustrated example of the terminator 4 includes a termination resistor 10 in series with a termination capacitor 11, both of which are likewise in series with an optional disconnection switch 12 which, if present, can be selectively opened (to the configuration as illustrated in FIG. 1) so as to disconnect the terminator 4 functionality from the bus 4.

A shunt resistance 13 is provided for use in sensing bus current and is discussed in further detail in relation to FIG. 2 below.

As an important feature of the present invention, the terminator 4 includes a bus analyzer 20 which receives its power by way of a supply 21. As will be appreciated, the bus analyzer is arranged to provide for relatively simple bus analysis which can be quickly and efficiently deployed, without requiring specialist staff/personnel. The terminator 4 can then provide for basic analysis, at any time as required, for example, during the commissioning of the bus 1, during initial use or as part of a "trouble-shooting" procedure, or even during periods of regular/irregular control signalling on the bus.

The result of such analysis can then be presented by way of any appropriate form of user interface. Various examples are illustrated with reference to FIG. 1 but it should be appreciate that the interface devices can be provided in any required number and combination. In the illustration provided by FIG. 1, examples of such devices are, an optical indicator 22, and audio indicator 23, a display screen 24, a radio transmitter 25, an alternative wireless interface 26, and connector socket 28.

As will therefore be appreciated, the terminator 4 embodying the present invention can advantageously comprise part of the bus 1 and can be remotely accessible as required. Such remote accessibility can be arranged to allow for activation/deactivation of the bus analyzer 20 and/or terminator functionality and/or selection of the specific diagnostic check to be conducted by the analyzer 20. The terminator 4 therefore has the inherent ability to offer at least some degree of diagnostic analysis useful, in particular, during commissioning of a network bus 1 such as a Fieldbus or Profibus trunk/segment.

FIG. 2 is a schematic diagram similar to that of FIG. 1, but in which a field side 2 of the bus 1 is further indicated and which of course has relevance when current is to be sensed by the shunt resistor 13. The configuration of the shunt resistor 13 in relation to the bus 1 within FIG. 2 is illustrated in accordance with bus-current sensing characteristic and this further example of the present mention is also illustrated in relation to a bus 1 employing a bus shield 3. In this manner, one of shield isolation sensing or current measuring can be provided as required.

FIG. 3 is a schematic representation of a complete network segment/trunk 1 employing terminator devices such as those 4 of FIGS. 1 and 2. The complete segment/trunk 1 is illustrated with the respective terminator devices 4 located at each end to offer the required termination for the segment/trunk. Schematic representations of further devices typically employed with, for example, a Fieldbus segment/trunk. That is, in the illustrated example, there is provided a Distributed Control System (DCS), or indeed some other form of controller 30, a Fieldbus power supply 31 for the segment/trunk 1, a power conditioner 32 arranged to superimpose data onto the segment/trunk supply and prevent crosstalk between adjacent, and an terminal device such as a field unit 33, and/or barrier 34 and/or bus isolator 35.

Of course, the present invention is not restricted to the details of the foregoing examples and embodiments. For example, any appropriate further termination and bus analysis functionality can be provided as required. With regard to the segment/trunk 1 configuration of FIG. 3, the segment/trunk can of course form part of any appropriate signalling network and any required number of terminator/analysis devices 4 of the present invention can be provided. As noted above, the termination functionality of such devices 4 can be selectively initiated responsive to the location of the device 4 on the segment/spur 1.

The invention claimed is:

1. A bus network terminator having a termination functionality for a bus network, the bus network terminator comprising:
    a diagnostic analyzer configured to:
        identify whether data is present on a segment of the bus network, and
        identify a degree of data activity and/or a direction of transmission on the segment of the bus network; and
    a line impedance terminator offering an in-line diagnostic functionality;
    wherein the diagnostic analyzer and the line impedance terminator are integrated in a bus device of the bus network; and
    wherein the bus network terminator is configured to selectively initiate the termination functionality responsive to a location of the bus network terminator in the bus network.

2. A bus network terminator as claimed in claim 1, and configured to provide for analysis of a segment/trunk/line on-which it is located.

3. A bus network terminator as claimed in claim 2, wherein the said basic information comprises one or more of segment voltage, segment traffic and/or segment integrity.

4. A bus network terminator as claimed in claim 1, wherein the diagnostic analyzer comprises a basic, low-power microprocessor.

5. A bus network terminator as claimed in claim 4, wherein the microprocessor exhibits basic required electronics, to provide the required basic level of bus analysis.

6. A bus network terminator as claimed in claim 1, wherein the diagnostic analyzer is configured to analyse a trunk voltage condition.

7. A bus network terminator as claimed in claim 6, wherein the said diagnostic analyzer is configured to diagnose one or more of a high voltage condition, low voltage condition, a current condition, noise condition and/or unstable condition.

8. A bus network terminator as claimed in claim 1, wherein the diagnostic analyzer is configured to determine any one or more of data signal amplitude; data signal width; and signal stability/jitter.

9. A bus network terminator as claimed in claim 1 including an additional short-to-shield indication.

10. A bus network terminator as claimed in claim 1, and configured for indication of loss of isolation.

11. A bus network terminator as claimed in claim 10, and configured for indication of an impedance within a range from a few 100 KΩ to a short circuit condition.

12. A bus network terminator as claimed in claim 1 and including a user interface comprising an audio and/or visual output.

13. A bus network terminator as claimed in claim 1 and configured for remote accessibility.

14. A bus network terminator as claimed in claim 1 including a temperature indicator configured to indicate terminator temperature and/or local or ambient temperature.

15. A bus network terminator as claimed in claim 1 wherein the bus network terminator comprises a termination resistor in series with a termination capacitor.

16. A bus network terminator as claimed in claim 1, wherein the diagnostic analyzer is arranged to prove diagnostic analysis during commissioning of the bus network.

17. A bus network segment including a bus network terminator having a termination functionality for a bus network, the segment comprising:
a diagnostic analyzer configured to:
identify whether data is present on the segment of the bus network, and
identify a degree of data activity and/or a direction of transmission on the segment of the bus network; and
a line impedance terminator offering an in-line diagnostic functionality;
wherein the diagnostic analyzer and the line impedance terminator are integrated in a bus device of the bus network;
wherein the bus network terminator is configured to selectively initiate the termination functionality responsive to a location of the bus network terminator in the bus network.

18. A bus network terminator as claimed in claim 15 wherein the bus network terminator comprises a disconnection switch in series with the termination resistor and termination capacitor.

* * * * *